No. 752,806. PATENTED FEB. 23, 1904.
P. B. SOUTHWORTH.
EGG TESTER.
APPLICATION FILED NOV. 5, 1903.
NO MODEL.
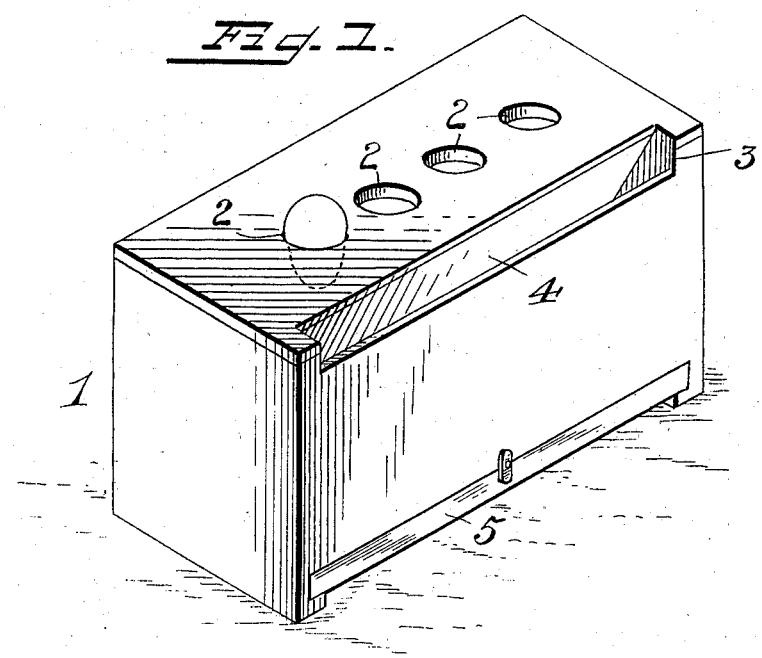
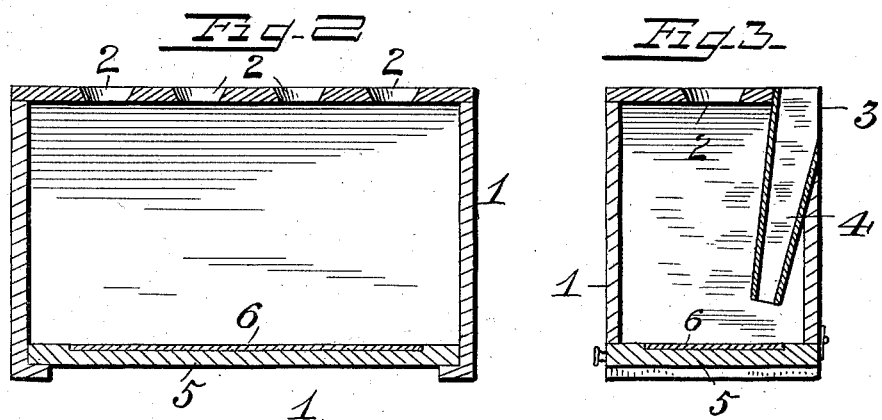
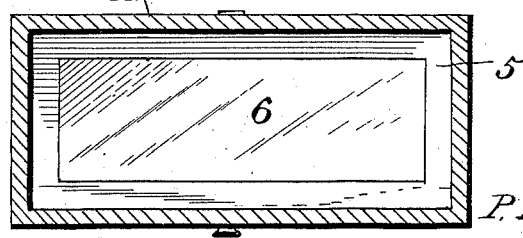
Witnesses
J. L. Onrand
Inventor
P. B. Southworth
by H. B. Willson
Attorney No. 752,806. Patented February 23, 1904.

UNITED STATES PATENT OFFICE.

PRESTON B. SOUTHWORTH, OF HILLSBORO, OREGON.

EGG-TESTER.

SPECIFICATION forming part of Letters Patent No. 752,806, dated February 23, 1904.

Application filed November 5, 1903. Serial No. 179,958. (No model.)

*To all whom it may concern:*

Be it known that I, PRESTON B. SOUTHWORTH, a citizen of the United States, residing at Hillsboro, in the county of Washington and State of Oregon, have invented certain new and useful Improvements in Egg-Testers; and I do declare the following to be a full, clear, and exact description of the invention, such as will enable others skilled in the art to which it appertains to make and use the same.

This invention relates to improvements in egg-testers.

The object of the invention is to provide a device of this character whereby a number of eggs at a time may be quickly and reliably tested.

A further object is to provide a device of this character which will be simple in construction, efficient and reliable, inexpensive, and well adapted to the purpose for which it is intended.

With these and other objects in view the invention consists of certain novel features or construction, combination, and arrangement of parts, as will be more fully explained, and particularly pointed out in the appended claim.

In the accompanying drawings, Figure 1 is a perspective view of the improved egg-tester. Fig. 2 is a vertical longitudinal sectional view. Fig. 3 is a vertical cross-section, and Fig. 4 is a horizontal sectional view of the same.

Referring to the drawings more particularly, 1 denotes a box or casing which is preferably oblong in shape. In the upper side or top of the box is formed a centrally-disposed row of holes 2, of which there may be any desired number, depending upon the length or capacity of the box. The diameter of the holes 2 is such as to admit the end of an egg without permitting it to drop through, the holes being conically formed, as shown, to conform to the shape of the egg. In one of the upper edges or corners of the side of the box is formed an elongated opening 3, in which is inserted an elongated frusto-triangularly-shaped tube 4, the larger end of which is arranged uppermost, said tube being of such length that the lower end extends to near the bottom of the box or casing 1. The tube is arranged in the box at an angle with the lower end projecting toward the center of the same. The bottom 5 of the box is made removable from the body of the same, and within the box and fixed to said bottom is arranged a mirror 6, which is of a length and breadth corresponding to the space occupied by the row of egg-holes in the top of the casing and in which the eggs in said holes will be reflected. The interior of the box or casing and the frame around the mirror is painted black or lined with a suitable black material. The bottom of the casing is made removable in order that the mirror may be kept clean and polished.

In the operation of the device the eggs to be tested are placed in the holes 2, the shape of the edges of which fit the sides of the eggs, so as to exclude all light from the interior of the box except that which will pass through the eggs if they are fresh. The operator now looks into the upper end of the tube 4, which directs the vision onto the mirror directly below the eggs. If the eggs are fresh, the light will pass through them onto the mirror, which will reflect the eggs. If, on the other hand, any of the eggs should not be fresh, the light will not pass through the same, and therefore they will not be reflected in the mirror.

Thus it will be seen that by the use of a testing device such as herein described a large number of eggs may be quickly and reliably tested without the use of artificial light.

Having thus described my invention, what I claim as new, and desire to secure by Letters Patent, is—

An egg-tester, comprising a box or casing having egg-holding openings at the top thereof, an elongated sight-opening in rear of said egg-holding opening, a removable bottom, a mirror carried by said removable bottom, and a broad tapering sight-tube extending at an angle within the box from said sight-opening to a point in proximity to the mirror, substantially as described.

In testimony whereof I have hereunto set my hand in presence of two subscribing witnesses.

PRESTON B. SOUTHWORTH.

Witnesses:
L. W. HOUSE,
R. P. SIMON.